United States Patent [19]

Jonner

[11] Patent Number: 4,971,400
[45] Date of Patent: Nov. 20, 1990

[54] METHOD AND APPARATUS FOR TRACTION CONTROL (ASR)

[75] Inventor: Wolf-Dieter Jonner, Schmidhausen, Fed. Rep. of Germany

[73] Assignee: Robert Bosch GmbH, Stuttgart, Fed. Rep. of Germany

[21] Appl. No.: 379,754

[22] Filed: Jul. 14, 1989

[30] Foreign Application Priority Data

Sep. 21, 1988 [DE] Fed. Rep. of Germany ....... 3832025

[51] Int. Cl.$^5$ .......................... B60T 8/32; B60K 28/16
[52] U.S. Cl. ..................... 303/110; 180/197; 180/233; 192/1.31; 303/116; 303/119
[58] Field of Search ............... 303/110, 116, 119, 113, 303/93, 91, 96; 192/1.31, 1.32, 1.33, 13 A, 13 R, 4 R, 4 A, 3.51; 180/197, 244–250, 233; 188/181

[56] References Cited

U.S. PATENT DOCUMENTS

| | | | |
|---|---|---|---|
| 4,416,347 | 11/1983 | Bertling et al. | 180/197 |
| 4,702,337 | 10/1987 | Burckhardt et al. | 180/197 |
| 4,838,620 | 6/1989 | Sypniewski | 303/110 |
| 4,872,732 | 10/1989 | Stegmaier | 303/110 |

FOREIGN PATENT DOCUMENTS 2119883 11/1983 United Kingdom .

Primary Examiner—Douglas C. Butler
Attorney, Agent, or Firm—Edwin E. Greigg

[57] ABSTRACT

A system for traction control (ASR) and an aid for initiating movement on an incline for spinning wheels in an anti-skid brake system (ABS) having ABS multipositional control valves between the wheel brake cylinders and the master brake cylinder. The system includes a tank chamber for receiving a volume of pressure fluid, and a recirculating pump for pumping fluid during a traction control. The driver first actuates the brake to stop the vehicle, then by switch actuation, triggers an ASR reversing valve that interrupts fluid communication with a master brake cylinder, whereupon on starting movement, the ABS control valves are triggered to relieve the brake pressure into the tank chamber and then, if a wheel is spinning, the recirculating pump for generating brake pressure and the ABS control valve acted upon it for ASR brake pressure modulation are selectively triggered.

18 Claims, 2 Drawing Sheets

METHOD AND APPARATUS FOR TRACTION CONTROL (ASR)

BACKGROUND OF THE INVENTION

The invention relates to a method for traction control (ASR) which will aid initiating movement on an incline.

The simultaneous use of ABS (anti-skid braking system) components provided in automobile brake systems for traction control or as an aid in starting movement uphill or on a slippery surface is known from British Pat. No. 2,119,883. The patented device makes use of a special embodiment of an anti-skid system, the so-called ABS-2. This kind of known anti-skid system is provided with pressure fluid tanks combined with a recirculating pump. In the ABS step of pressure reduction, the pressure fluid reservoirs receive pressure fluid from the wheel brake cylinders through the ABS control valves, which are usually of the 3/3-way type, switched accordingly. Via the recirculating pump, which communicates with the reservoir tanks or chambers, the pressure fluid then reaches the connecting line between the master brake cylinder and the wheel cylinders; as related to the standpoint of the master brake cylinder, the connection is typically located upstream of the ABS control valves.

To achieve traction control on the basis of this known, separate ABS-2, British Pat. No. 2,119,883 provides an additional pressure tank, which in the event of a traction control function communicates via a 3/2-way valve with the pressure line leading to the wheel brake cylinders. Depending on the triggering of the ABS control valves for the ASR (traction control) function to be achieved, the fluid pressure available in this pressure tank reaches whichever wheel brake cylinder on the driven axle is to be selectively triggered to attain a locking differential effect; in that case, the ABS control valves are triggered inversely, which can be done via a suitably embodied control logic circuit for the combined ABS/ASR situation.

For economical yet fully high-quality traction control by using the components of the anti-skid control means, a further pressure controlled reversing valve, an overpressure valve and a pressure switch are provided in addition to the pressure tank and the magnet valve connecting it with the wheel cylinders.

The pump is designed as an aspirating pump, and whenever there is not enough pressure in the tank, upon the switchover of the magnet valve, for attaining traction control functions, the pump is triggered either via the pressure switch or directly by the electronic control unit, so that it feeds pressure fluid into the pressure tank or into the brake circuit connected to it. The additionally provided pressure controlled reversing valve opens when a predetermined minimum pressure is attained at the outlet of a feed pump storage chamber, and thus causes pressure fluid to flow from the master brake cylinder to the reservoir chamber and provides for refilling. Finally, the check valve that is also provided assures that the pressure between the magnet valve that switches over when ASR functions are to be performed and the ABS valves do not become excessively high in the vicinity of the wheel brakes.

U.S. Pat. No. 4,416,347 also discloses the use of ABS components for traction control or as an uphill movement starting aid, with corresponding "inverse" triggering of the ABS control valves and modification of other existing components, although if both driven wheels are spinning very markedly, additional means are provided, which lower the output power of the driving engine, by exerting influence on the mechanical connection between the gas pedal and the throttle valve in the intake tube of the engine. This can be done with the aid of an electromagnetically triggered 3/2-way valve.

In a further combined apparatus for achieving both anti-skid and traction control functions using the same components, the ABS system is assigned an additional pressure tank, which serves to supply braking pressure in the event of traction control functions. This pressure tank can be charged under valve control with the aid of the recirculating pump of the anti-skid system; the recirculating pump feeds into this tank during the pressure reduction phases of the traction control. Outside such control phases, or in other words during normal operation, the pressure tank can be recharged either by actuating the vehicle brake, or, if the vehicle is stopped or is in a non-braked operating state, by automatic activation of a charging circuit with the cooperation of the recirculating pump.

Here, precisely as in the combined systems discussed earlier above, additional hardware components are needed—that is, at least one additional pressure tank and hydraulic lines connecting it with the other components—and the required pressure for achieving traction control functions is always drawn from this additional pressure tank.

OBJECT AND SUMMARY OF THE INVENTION

It is an object of the present invention, based on an anti-skid system of the ABS-2 type, to embody this system with the fewest possible additional means in such a way that, when considering the driver and using appropriate software that can be installed in the control unit (on-board computer) without difficulty, an effective traction control or uphill movement starting aid can be achieved, with a pressure level that is independent of the function of the tank chamber that the ABS-2 system always has.

The invention attains its object and has an advantage that even though it dispenses with an additional supply of energy, nevertheless traction control functions can be achieved at very little additional expense by effectively generating braking pressure, in the sense of a locking differential effect, at the wheel that is spinning.

The only additional hardware expense required is a reversing valve, preferably in the 3/2-way version; in an advantageous embodiment, two check valves can also be used, one of which is an overpressure check valve. The invention uses the existing basic components of an ABS-2 type of anti-skid system, that is, the existing recirculating pump, and the pressure tank present as an ABS component, though instead of using the possibly limited pressure generated by this tank, in the traction control situation the desired selective braking pressure action is generated by drawing pressure fluid from the tank with a recirculating pump.

Another advantage is that the invention expressly includes the driver of the vehicle in the achievement of traction control functions, so that these functions are attainable only when the driver considers them desirable. Both normal braking and the attainment of anti-skid functions in a given situation can be performed unhindered by the expanded possibilities of the traction control functions.

Other advantageous features of the invention are disclosed herein. For instance, parallel to the reversing magnet valve, a one-way valve is connected in the direction of the wheel brake, so that even during the performance of traction control functions, while the reversing magnet valve is triggered, the brakes can still be actuated.

The invention will be better understood and further objects and advantages thereof will become more apparent from the ensuing detailed description of a preferred embodiment taken in conjunction with the drawing.

DESCRIPTION OF THE PREFERRED EMBODIMENT

Figure 1:
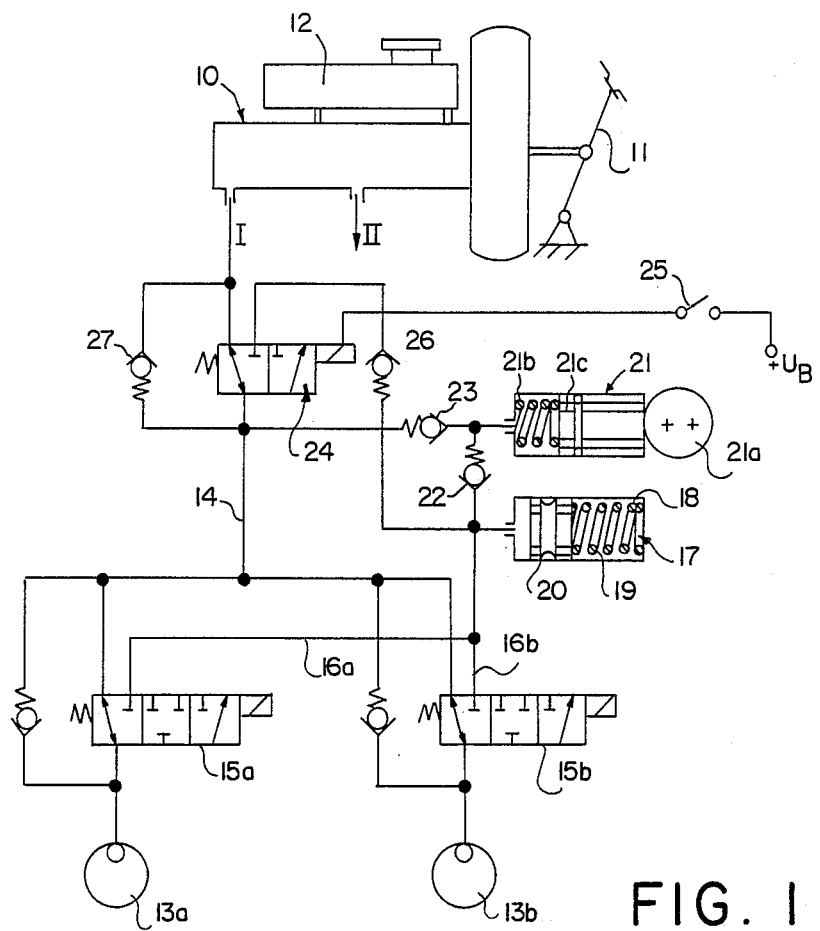
FIG. 1 schematically shows a detail of an automobile brake system with the master brake cylinder and some ABS components, as well as several modifications made possible by the invention.

It should be noted at the outset that the drawing shows only the hardware components necessary for the invention; to trigger the electromagnetic reversing and control valves provided, an electronic control circuit not shown in the drawing, preferably in the form of a program-controlled computer, is provided, which triggers and reverses the switches as necessary on the basis of the output signals supplied to it by well known wheel sensors and possibly other information. Such control circuits are known for standard brake systems including associated ABS components, so these features need no further description here, even in the expanded version for traction control (ASR) operation.

In the drawing, the master brake cylinder of the brake system is shown at 10; it includes the brake pedal actuation 11 and a supply tank 12 for the pressure fluid; in the present case, two separate brake circuits I and II are provided, each either leading to the wheels of a different axle, or with diagonal brake circuit layout, each acting on one front and one rear, diagonally opposed wheel.

It is assumed that in the exemplary embodiment shown, brake circuit I, which is shown in detail, is connected in its particular layout with the wheel brake cylinders 13a, 13b of the wheels of the driven axle; in a known manner, multi-position magnet valves 15a, 15b (3/3-way valves) that effect the ABS functions of pressure buildup, pressure maintenance and pressure reduction are incorporated into the pressure line from the master brake cylinder 10, between the master cylinder and the wheel brake cylinders 13a, 13b.

To receive excess pressure fluid in the ABS function of pressure reduction, the applicable valve connection 16a, 16b communicates with an end chamber 17, which in a cylindrical housing 18 includes a piston 20 biased by a spring 19. To recirculate the pressure fluid received by the tank chamber back into the brake circuit, a recirculation pump 21, RFP for short, communicates via a one-way pump inlet valve 22 with the tank chamber 17 and via a one-way pump outlet valve 23 with the main connecting line 14 between the master brake cylinder 10 and the wheel brake cylinders.

In order to achieve a traction control or uphill movement starting aid according to the invention on the basis of this kind of brake system having an ABS-2 type of anti-skid system, the only additional hardware component is a magnetic reversing valve 24, MVU for short (this abbreviation is mentioned here to facilitate interpreting the flow chart that follows later below), installed in the master brake circuit I of the driven axle upstream of the ABS control valves 15a, 15b. The reversing magnet valve 24 is preferably a 3/2-way valve; the connection of the pump outlet side of the recirculating pump 21 is between this magnetic reversing valve 24 and the 3/3-way magnet valves provided for the traction control functions. The structure of the recirculating pump 21 may be such that, as schematically shown in the drawing, this pump has a piston 21c which is biased by a spring 21b and driven by a cam 21a.

To achieve startup movement traction control or an aid in uphill movement starting, the driver of the vehicle equipped with this kind of modified brake system actuates the brake to stop the vehicle, while the vehicle is stopped, and also, by manual actuation of a switch 25 connected to the power source UB, brings about the switchover of the reversing magnet valve 24 to attain traction control (ASR) functions; this valve will hereinafter be called the ASR valve.

If the driver now trips the brake, then because the ASR valve 24 has been switched over into its other position, the brake pressure previously brought to bear by the driver is fed into the driven axle. Startup signals or the instant for startup can be ascertained by using already existing sensors; e.g., disengagement of the clutch (with standard transmissions), corresponding signals in the case of an automatic transmission, or actuation of the gas pedal, taking a minimum engine rpm into account and using it. This is followed first by triggering of the ABS control valves 15a, 15b, here embodied as 3/3-way valves, into the third position, in which the brake pressure that has been fed in and so far maintained is relieved by flowing into the end chamber of tank 17.

The process then continues as follows. If the vehicle is set into motion without excessive loss of traction, as detected by the already existing ABS wheel sensors, then when a certain speed is attained, which may be on the order of 40 km/h (25 mph), the ASR magnet valve 24 is de-excited, and by briefly triggering the recirculating pump motor, the volume of pressure fluid relieved into the end chamber of tank 17 is returned to the master brake cylinder.

On the other hand, if on starting to move an an excessive loss of traction (spinning) is detected at a wheel, then with the ABS control valves now back in the first position that assures normal communication between the master brake cylinder and the wheel brake cylinders, although the communication with the master brake cylinder is still interrupted by the position of the ASR valve, brake pressure is generated by immediately triggering the recirculating pump; as noted, this pressure is blocked off toward the master brake cylinder 10 by the excited ASR magnet valve 24, and is now modulated as required in the wheel brake cylinder of the spinning wheel by the ABS control valves 15a or 15b, suitably triggered for attaining traction control functions.

It is recommended that the control algorithm in the ABS/ASR control unit be made such that primarily, only one driven wheel at a time is braked, the goal being synchronization of the wheel speeds of the driven wheels so as to provide a locking differential effect.

If under special circumstances both of the driven wheels are spinning, then excessive engine torque is fundamentally present; automatic intervention can be made in a known manner by controlling the engine torque, for instance by acting on the throttle valve, and the drive power produced by the engine can be reduced; optionally, taking the driver into account, the driver can be informed of this situation by an optical and/or acoustical signal, so that the driver himself can reduce the gas pedal position.

Since the recirculating pump 21 attempts to pump the entire volume previously stored in the tank 17 back out again, yet the need for braking a spinning wheel may sometimes be less, it is advantageously possible, to avoid an undesirable overpressure, to effect a corresponding relief of excess pressure, by providing an overpressure valve 26 and switching it such that in the excited or triggered position of the ASR magnet valve 24, the outlet side of the recirculating pump 21 communicates with the tank 17. As a result, on the one hand, depending on the design of the overpressure check valve 26, the maximum pressure that can be generated by the recirculating pump 21 is limited; on the other hand, the originally captive volume of pressure fluid is as a result made to recirculate constantly, and so it can be drawn on as needed for brake pressure modulation.

It is appropriate to allow use of the traction control or ASR only within a limited speed range (for example, up to 40 km/h maximum). If a suitably set limit speed is exceeded, the recirculation of pressure fluid volume into the master brake cylinder is effected, as described above, by triggering of the recirculating pump once the ASR magnet valve 24 has been switched back.

To assure that brake actuation is possible at any time, even with the ASR magnet valve 24 triggered, a one-way or check valve 27 is finally also incorporated with a parallel fluid flow relative to the ASR magnet valve 24, in the direction of the wheel brake. The exemplary embodiment of the invention shown in the drawing has a hydraulic function switching layout for front- or rear-wheel brake circuit distribution; with a diagonal distribution, logically, two ASR magnet valves 24, check valves and overpressure valves are necessary.

Figure 2:
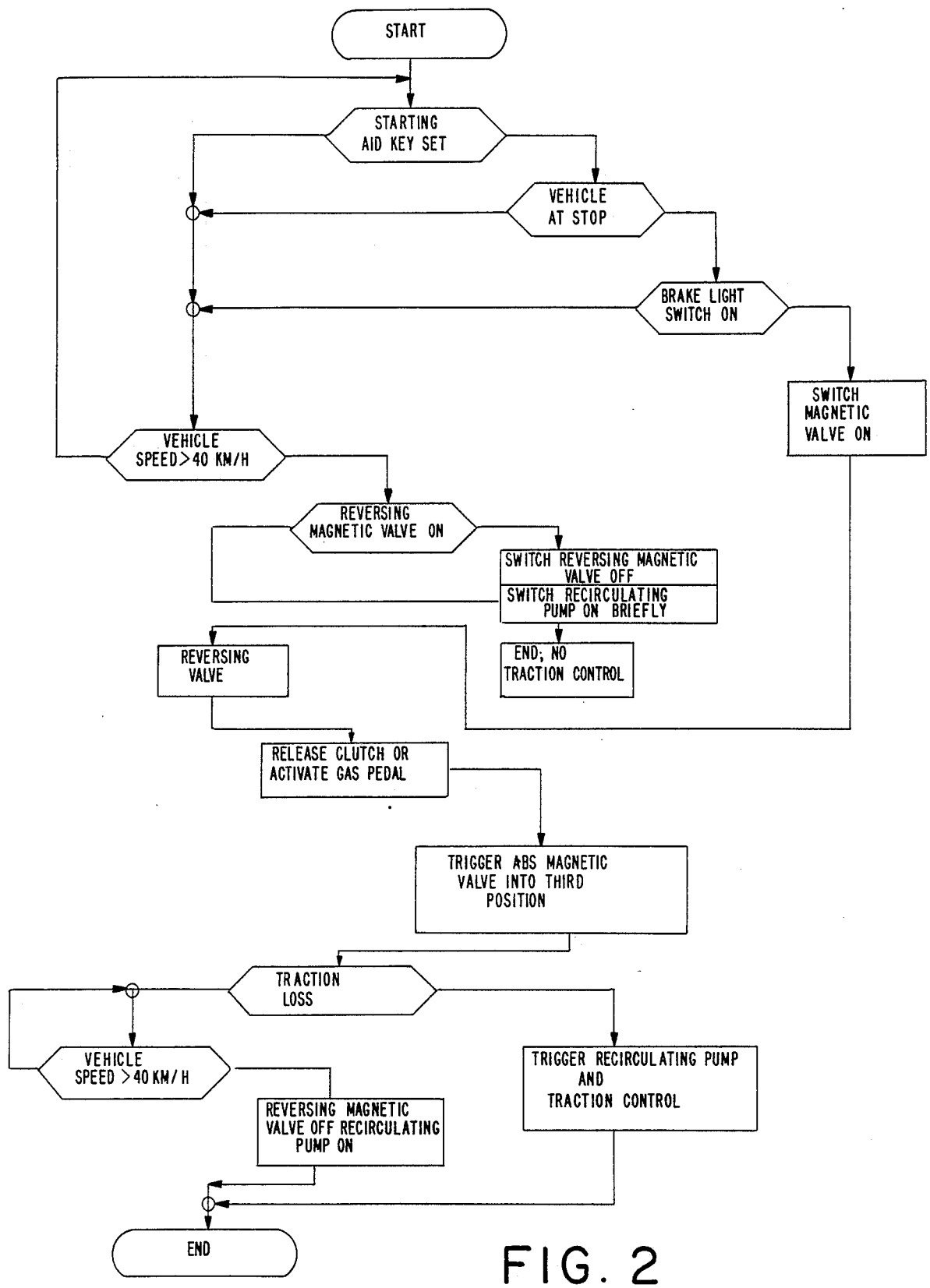
FIG. 2 illustrates a flow chart for a programmed operation of the traction control.

The flow chart shown in FIG. 2 for program controlled traction control or aiding in starting movement uphill that follows shows the functions as explained above that are to be performed by the control unit or computer, not shown. It will be understood that the invention is preferably used as part of a program controlled system on the part of the electronic ABS/ASR control unit; the ASR functions can for instance be called upon actuation of the switch or starting aid key 25—that is, upon switchover of the ASR valve 24 into the second position shown in the drawing.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A method for traction control (ASR) and an aid for initiating movement on an incline, wherein a selective locking braking action is performed via a locking differential action on driven wheels of a motor vehicle by means of components that are part of an anti-lock braking system (ABS), including ABS multi-positional control valves incorporated between wheel brake cylinders and a master brake cylinder, tank chambers for the reception of a volume of pressure fluid relieved by an ABS action, a recirculating pump for recirculating pressure fluid contained in the tank chambers to the master brake cylinder, which comprises applying the brakes to insure that the vehicle is not in motion, which feeds brake pressure via opened ABS multi-positional control valves (15a, 15b) to the wheel brake cylinders (13a, 13b) of the drive axle;

actuating a switch to actuate a reversing magnetic valve (24) incorporated between the master brake cylinder (10) and the ABS control valves to interrupt fluid communication with the master brake cylinder while the fed-in brake pressure is maintained;

putting the vehicle in gear;

upon intentional start of movement of the vehicle, triggering the ABS control valves (15a, 15b) in order to relieve the brake pressure from the wheel brake cylinders into the tank chamber (17); and upon recognition of a traction loss at a wheel exceeding a predetermined value, selectively triggering both the recirculating pump (21) for generating brake pressure, and the ABS control valves (15a, 15b) acted upon by it, for ASR brake pressure modulation.

2. A method as defined by claim 1, which includes switching off the ASR magnetic valve (24) upon exceeding a predetermined vehicle speed threshold ($V_F > 40$ km/h), and triggering the recirculating pump (21), to recirculate the pressure fluid volume contained in the tank chamber (17) back to the master brake cylinder.

3. A method as defined by claim 2, which includes closing the master brake line (14) off from the master brake cylinder (10) in order to attain a constant circulation of pressure fluid and simultaneously keep the pressure constant in the traction control situation, directing fluid pumped by the recirculating pump (21) to the line (14) by which pressure fluid is made to communicate with the tank chamber (17) via the ASR magnet valve (24) and an overpressure check valve (26).

4. A method as defined by claim 3, which includes detecting and evaluating the clutch position to detect the starting process of the motor vehicle, wherein appropriate signals cause triggering of the ABS control valves (15, 15b) to switch over into a third, relief position in which they communicate with the tank chamber (17).

5. A method as defined by claim 4, which also includes detecting and evaluating a gas pedal actuation to detect the starting process of the motor vehicle.

6. A method as defined by claim 3, which includes detecting and evaluating a gas pedal actuation to detect the starting process of the motor vehicle, wherein appropriate signals cause triggering of the ABS control valves (15, 15b) to switch over into a third, relief position in which they communicate with the tank chamber (17).

7. A method as defined by claim 2, which includes detecting and evaluating the clutch position actuation to detect the starting process of the motor vehicle, wherein appropriate signals cause triggering of the ABS control valves (15, 15b) to switch over into a third, relief position in which they communicate with the tank chamber (17).

8. A method as defined by claim 2, which includes detecting and evaluating a gas pedal actuation to detect the starting process of the motor vehicle, wherein appropriate signals cause triggering of the ABS control valves (15, 15b) to switch over into a third, relief position in which they communicate with the tank chamber (17).

9. A method as defined by claim 2, which also includes detecting and evaluating a gas pedal actuation to detect the starting process of the motor vehicle.

10. A method as defined by claim 1, which includes closing the master brake line (14) off from the master brake cylinder (10) in order to attain a constant circulation of pressure fluid and simultaneously keep the pressure constant in the traction control situation, directing fluid pumped by the recirculating pump (21) to the line (14) by which pressure fluid is made to communicate with the tank chamber (17) via the ASR magnet valve (24) and an overpressure check valve (26).

11. A method as defined in claim 10, which includes detecting and evaluating the clutch position to detect the starting process of the motor vehicle, wherein appropriate signals cause triggering of the ABS control valves (15, 15b) to switch over into a third, relief position in which they communicate with the tank chamber (17).

12. A method as defined by claim 10, which includes detecting and evaluating a gas pedal actuation to detect the starting process of the motor vehicle, wherein appropriate signals cause triggering of the ABS control valves (15, 15b) to switch over into a third relief position in which they communicate with the tank chamber (17).

13. A method as defined by claim 10, which also includes detecting and evaluating a gas pedal actuation to detect the starting process of the motor vehicle.

14. A method as defined by claim 1, which includes detecting and evaluating the clutch position to detect the starting process of the motor vehicle, wherein appropriate signals cause triggering of the ABS control valves (15, 15b) to switch over into a third, relief position in which they communicate with the tank chamber (17).

15. A method as defined by claim 1, which includes detecting and evaluating a gas pedal actuation to detect the starting process of the motor vehicle, wherein appropriate signals cause triggering of the ABS control valves (15, 15b) to switch over into a third, relief position in which they communicate with the tank chamber (17).

16. A method as defined in claim 1, which also includes detecting and evaluating a gas pedal actuation to detect the starting process of the motor vehicle.

17. An apparatus for traction control (ASR) and an aid for initiating movement on an incline, wherein a selective braking action is performed in the manner of a locking differential action on the driven wheels of a motor vehicle by the inclusion and utilization of components that are part of an anti-lock system (ABS), including ABS inlet and outlet control valves incorporated between wheel brake cylinders and the master brake cylinder (HBZ), tank chambers for the reception of a volume of pressure fluid relieved by an ABS action, a recirculating pump (RFP) for recirculating pressure fluid contained in the tank chamber to the master brake cylinder, for controlling traction which includes an ASR magnet valve (24) incorporated between the master brake cylinders (13a, 13b) upstream of the ABS control valves (15a, 15b), a switch which is manually operated to trigger said ASR magnet valve (24) to interrupt fluid flow to the master brake cylinder (10), and said ASR magnet valve (24) connects a master brake line (14) leading to the master brake cylinder to the tank chamber (17) via a overpressure check valve (26).

18. An apparatus as defined by claim 17, which includes one-way check valve (27) that opens in a direction toward the wheel brake cylinders, said one-way check valve (27) is disposed parallel to the ASR reversing valve (24) for bypassing fluid flow by said ASR magnet valve.

* * * * *